United States Patent
Dilliplane et al.

(10) Patent No.: US 6,195,105 B1
(45) Date of Patent: Feb. 27, 2001

(54) METHOD AND APPARATUS FOR IMPROVED CONCURRENT VIDEO GRAPHIC PROCESSING

(75) Inventors: Steven C. Dilliplane, Yardley, PA (US); Indra Laksono, Richmond; Antonio Asaro, Scarboro, both of (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/088,190

(22) Filed: Jun. 1, 1998

Related U.S. Application Data

(63) Continuation-in-part of application No. 09/047,193, filed on Mar. 24, 1998, now Pat. No. 5,990,910.

(51) Int. Cl.⁷ .................................................... G06T 1/20
(52) U.S. Cl. ........................... 345/506; 345/508; 345/521
(58) Field of Search .................... 345/505, 506, 345/520, 521, 513, 422, 421, 508

(56) References Cited

U.S. PATENT DOCUMENTS

| | | | |
|---|---|---|---|
| 4,862,392 * | 8/1989 | Steiner ................................. | 395/427 |
| 5,751,291 * | 5/1998 | Olsen et al. .......................... | 345/422 |
| 5,898,437 * | 4/1999 | Deolaliker ............................ | 345/421 |
| 5,920,881 * | 7/1999 | Portefield ............................. | 711/2 |
| 5,995,109 * | 11/1999 | Goel et al. ........................... | 345/423 |
| 5,999,183 * | 12/1999 | Kilgariff et al. ..................... | 345/418 |

* cited by examiner

Primary Examiner—Kee M. Tung
(74) Attorney, Agent, or Firm—Markison & Reckamp, P.C.

(57) ABSTRACT

A method and apparatus for improved concurrency within a video graphics process by generating culling information from geometry information. The geometry information corresponds to an image to be rendered, and the culling information indicates the triangles of the objects of the image that are in a front-facing or back-facing position. Having generated the culling information, set-up information is generated therefrom. The set-up information provides rendering data for the triangles of the object of the image being rendered. Next, pixel data is generated for a triangle based on the set-up information. To improve the concurrency, the queuing and the retrieval of the culling information and the set-up information from non-local memory are controlled such that the generating of the culling information, the set-up information, and the pixel data is done with improved concurrency.

12 Claims, 4 Drawing Sheets

METHOD AND APPARATUS FOR IMPROVED CONCURRENT VIDEO GRAPHIC PROCESSING

This invention is a continuation in part of co-pending application entitled "Method and Apparatus for Co-processing Multi-formatted Data," having an attorney docket number of 0100.01146, a U.S. Ser. No. of 09/047, 193, having a filing date of Mar. 24, 1998, now U.S. Pat. No. 5,990,910 and assigned to the same assignee as the present invention.

TECHNICAL FIELD OF THE INVENTION

The present invention relates generally to video graphic circuits and more particularly to improved concurrency between the elements of a video graphics circuit.

BACKGROUND OF THE INVENTION

As is known, video graphics circuits are utilized in computers to process images for subsequent display on a display device, which may be a computer monitor, a television, an LCD panel, and/or any other device that displays pixel information. Typically, the central processing unit of a computer generates geometric data regarding the images to be rendered and provides the geometric data to the video graphic circuit. The video graphic circuit, upon receiving the geometric data, processes it to generate pixel data of the image. As the video graphics circuit is generating the pixel data, it stores the pixel data in a frame buffer. When the video graphic circuit has processed a full frame of geometric data, the frame buffer is full and provides the pixel data to the display device.

Typically, the video graphics circuit includes a culling module, a set-up module, and a raster module. The central processing unit includes software to generate geometric information for the images to be rendered. The geometric information is provided to the culling module, which, in turn, produces culling information. As is known, the culling information indicates which triangles of objects of the image are front facing and which are back facing. The front facing triangles are those that are visible to a viewer on the display device and the back facing of those that are not viewable. In addition, the culling module passes the geometric information of the front facing triangles, or objects, to the set-up module. The set-up module in-turn generates set-up information based on the culling information 32 and the geometric, or geometry, information. The set-up information includes physical coordinates, texture coordinates, color information, etc. for a given pixels within the object. The raster module receives the set-up information and generates the pixel data based on set-up information. The pixel data is subsequently provided to the display device for display.

The culling module, the set-up module, and the raster module of the video graphics circuit are serially coupled therefor their processes are interdependent. As such, bottlenecks may occur depending on the type of information being processed. For example, if a plurality of very small triangles is being processed, a bottleneck will occur at the set-up module, since it is generating the object parameters for a plurality of objects. Alternatively, a bottleneck may arise at the raster module when large triangles are being rendered. As such, there are several instances during the rendering of most frames where one or more modules are stalled waiting for the other module to complete its particular function.

Typically, first-in first-out (FIFO) buffers will be located between the modules of the video graphics circuit to provide buffering. However, the FIFOs are relatively small and often encounter an overflow or underflow condition, which stalls the associated intra-video graphics modules. To reduce the overflow/underflow condition, one could increase the size of the FIFOs. While this is theoretically possible, it is impractical due to the additional memory needed and its corresponding cost.

Therefore, a need exists for a method and apparatus that increases intra-video graphic processing concurrency.

DETAILED DESCRIPTION OF THE DRAWINGS

Generally, the present invention provides a method and apparatus for improved concurrency within a video graphics process. Such an improvement arises by generating culling information from geometry information. The geometry information corresponds to an image to be rendered, and the culling information indicates the triangles of the objects of the image that are in a front-facing or back-facing position. Having generated the culling information, set-up information is generated therefrom. The set-up information provides rendering data for the triangles of the object of the image being rendered. Next, pixel data is generated for a triangle based on the set-up information. To improve the concurrency, the queuing and the retrieval of the culling information and the set-up information from non-local memory are controlled such that the generating of the culling information, the set-up information, and the pixel data is done with improved concurrency. With such a method and apparatus, the concurrency between the modules within the video graphics processing system can be improved by utilizing external memory. By controlling the writing and reading of culling information and set-up information to and from the non-local memory, the concurrency between the video graphic modules is improved.

Figure 1:
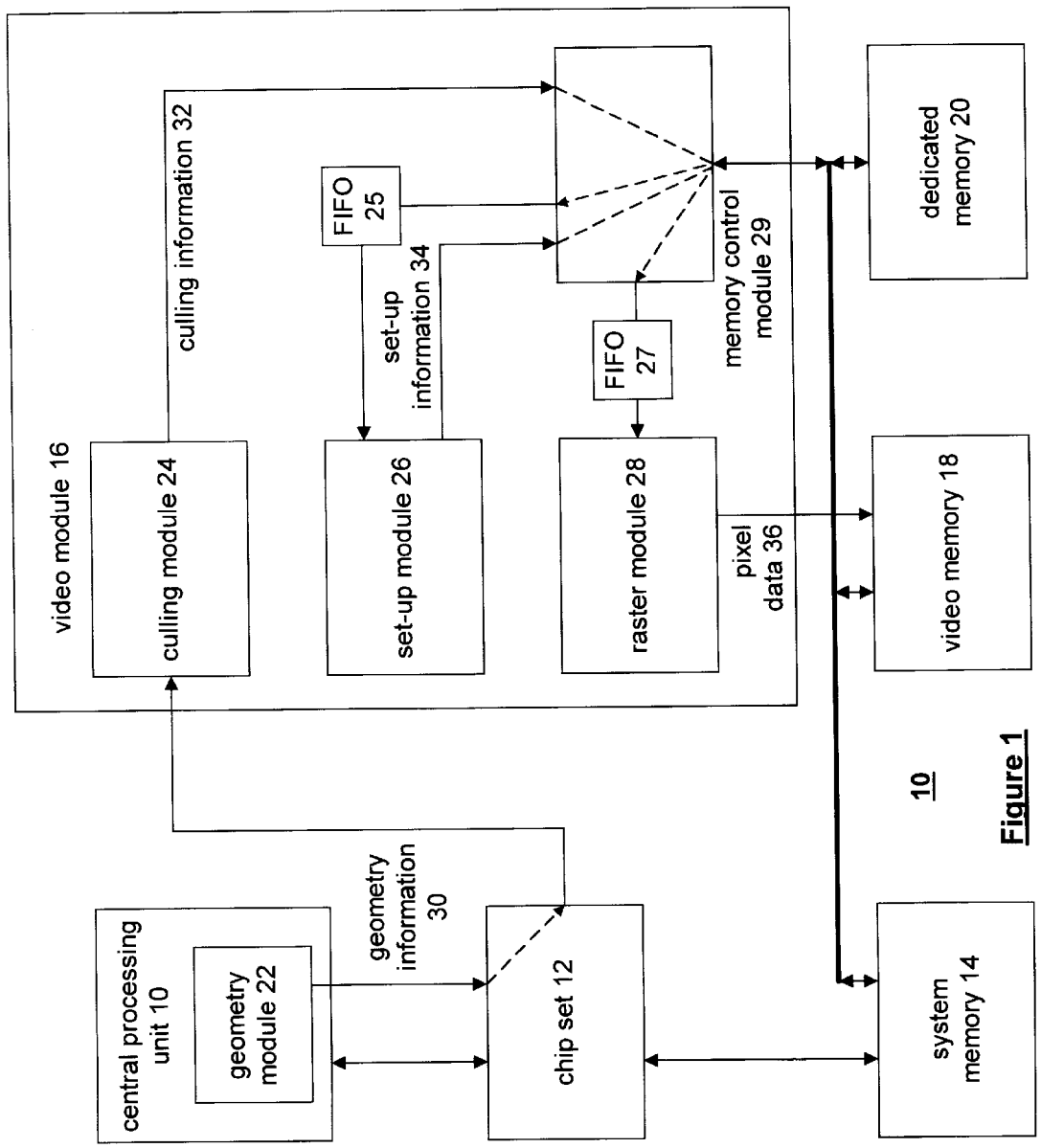
FIG. 1 illustrates a schematic block diagram of a video processing system in accordance with the present invention.

The present invention can be more fully described with reference to FIGS. 1 through 5. FIG. 1 illustrates a schematic block diagram of a video processing system 10 that includes a central processing unit 11, a chip set 12, system memory 14, a video module 16, video memory 18, and dedicated memory 20. The central processing unit 11 may be a central processing unit as found in a personal computer, laptop computer, and/or work station. In addition, the central processing unit includes programming instructions that cause it to function as a geometry module 22. While functioning as the geometry module 22, the central processing unit generates geometry information 30 for an image to be rendered. Note that the geometry information produced by the central processing unit may be done based on programming instructions to produce vertex information of object elements of the image being rendered. Further note that for the purposes of this discussion, an image will correspond to a frame of data for display on a computer monitor and/or a field of data for display on a television.

The chip set 12, which is typically found in a personal computer, functions as an interface between the central processing unit, system memory, video processing circuitry, audio processing circuitry and/or peripheral devices. For processing images for display, the chip set 12 receives the geometry information 30 and passes it to the video module 16. In addition, or alternatively, the chip set may provide the geometry information 30 to the system memory 14, which, in turn, is retrieved under the control of the memory controller module 29 of the video module 16.

The video module 16 includes a culling module 24, a set-up module 26, a raster module 28, a memory control module 29, a first FIFO 25, and a second FIFO 27. The culling module 24 is operably coupled to receive the geometry information 30 and to produce, therefrom, culling information 32. The culling information is provided to memory controller 29, which controls the storing of the culling information 32 in the system memory 14, the video memory 18, and/or the dedicated memory 20. In addition, the memory controller 29 controls the retrieval of the culling information 32 and the providing of it to FIFO 25. Note that the FIFOs 25 and 27 are included to compensate for the latencies in memory retrieval. Further note that the culling information 32 may be compressed prior to storage in the system memory 14.

The set-up module 26 is operably coupled to receive the culling information 32 via FIFO 25 and produce therefrom the set-up information 34. The set-up information 34 is provided to the memory control module 29. The memory control module 29 may store the set-up information 34 in the system memory 14, the video memory 18, and/or the dedicated memory 20. The raster module 28 is operably coupled to receive the set-up information 34 via the FIFO, which has been retrieved under the memory controller 29, and to produce therefrom pixel data 36. The pixel data 36 is written to the video memory 18. Note that the set-up information 34 may be compressed prior to storage in the memory 14, 18, and/0\or 20.

In addition to providing the non-local memory access between the modules shown, the geometry information may be written into the non-local memory (e.g., the system memory 14, video memory 18, dedicated memory 20). The queuing (e.g., storing), and retrieval of the geometry information 30 from the non-local memory is under the control of memory control module 29.

The culling module 24, the set-up module 26, and the raster module 28, function in a similar fashion as like modules within a video graphics processor such as the Rage Pro, and./or Rage 128 produced and manufactured by ATI Technologies. Alternatively, the modules 24–28 may be implemented in software and performed by various co-processors to achieve the desired video graphics processing. The memory control module 29 may function in accordance with the parent application entitled "Method and Apparatus for Co-Processing Multi-Formatted Data," having Ser. No. 09/047,193, filed Mar. 24, 1998 now U.S. Pat. No. 5,990,910 having the same assignee as the present invention. Further note that the dedicated memory 20 may be random access memory, magnetic tape, hard drive, and/or any device that stores digital information.

Figure 2:
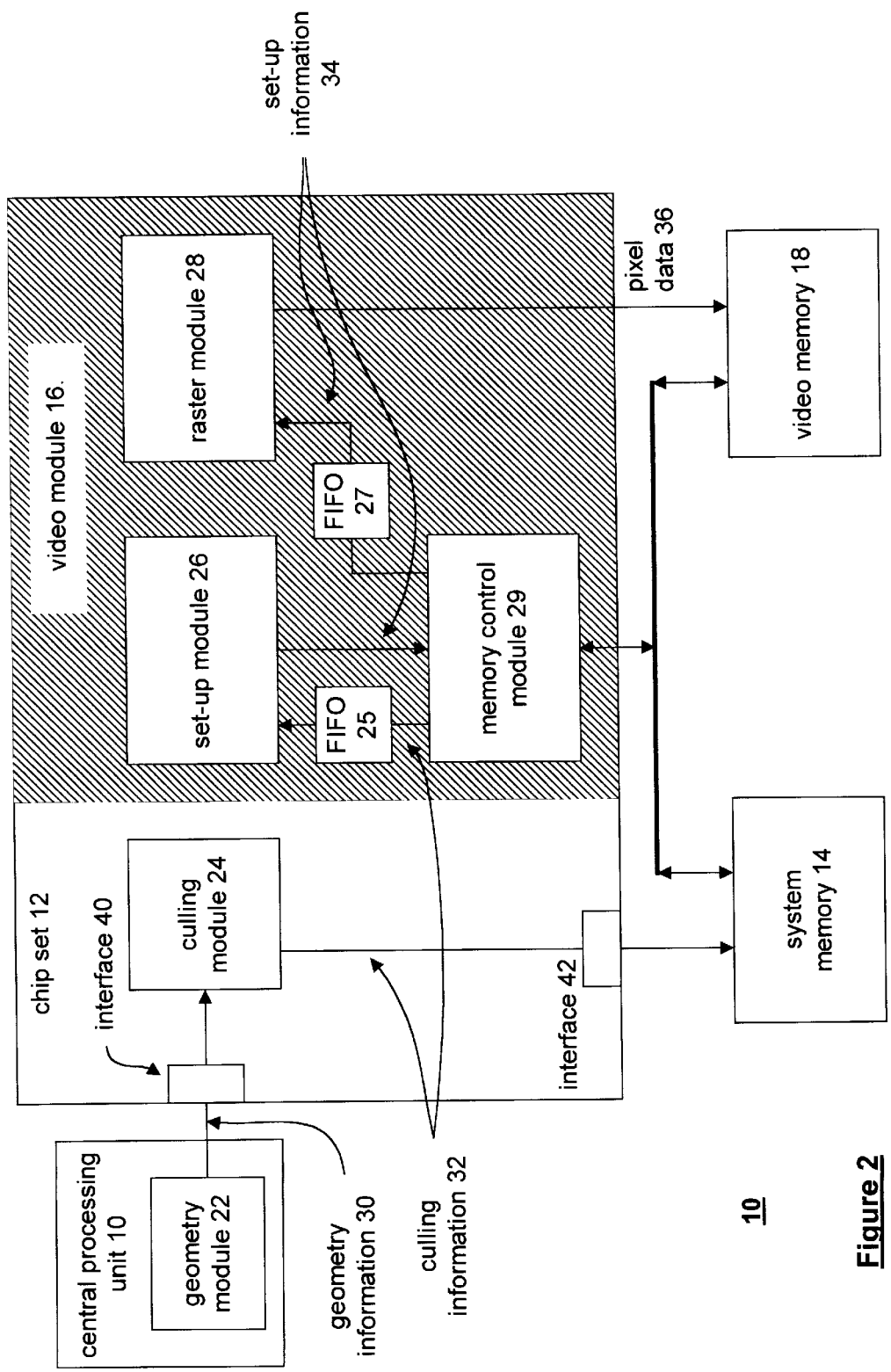
FIG. 2 illustrates a schematic block diagram of an alternate video graphic processing system in accordance with the present invention.

FIG. 2 illustrates an alternate arrangement of the video processing system 10. As shown, the chip set 12 includes the culling module 24, while the video module 16, includes the set-up module 26 and the raster module 28. The functionality of the circuits is similar to the functionality described with reference to FIG. 1. As shown, the chip set 12 includes an interface 40 that interfaces the culling module 24 with the central processing unit 11. The chip set 12 further includes an interface 42 that interfaces the culling module 24 with the system memory 14. In this configuration, the culling module produces the culling information 32 in real time as it receives the geometry information 30. As such, minimal buffering is needed between the geometry module 22 and the culling module 24.

The chip set 12 may further be expanded to include the set-up module 26 and/or the raster module 28. In this configuration, the memory control module 29 could utilize the system memory 14 for the culling information and the video memory for the set-up information.

Figure 3:
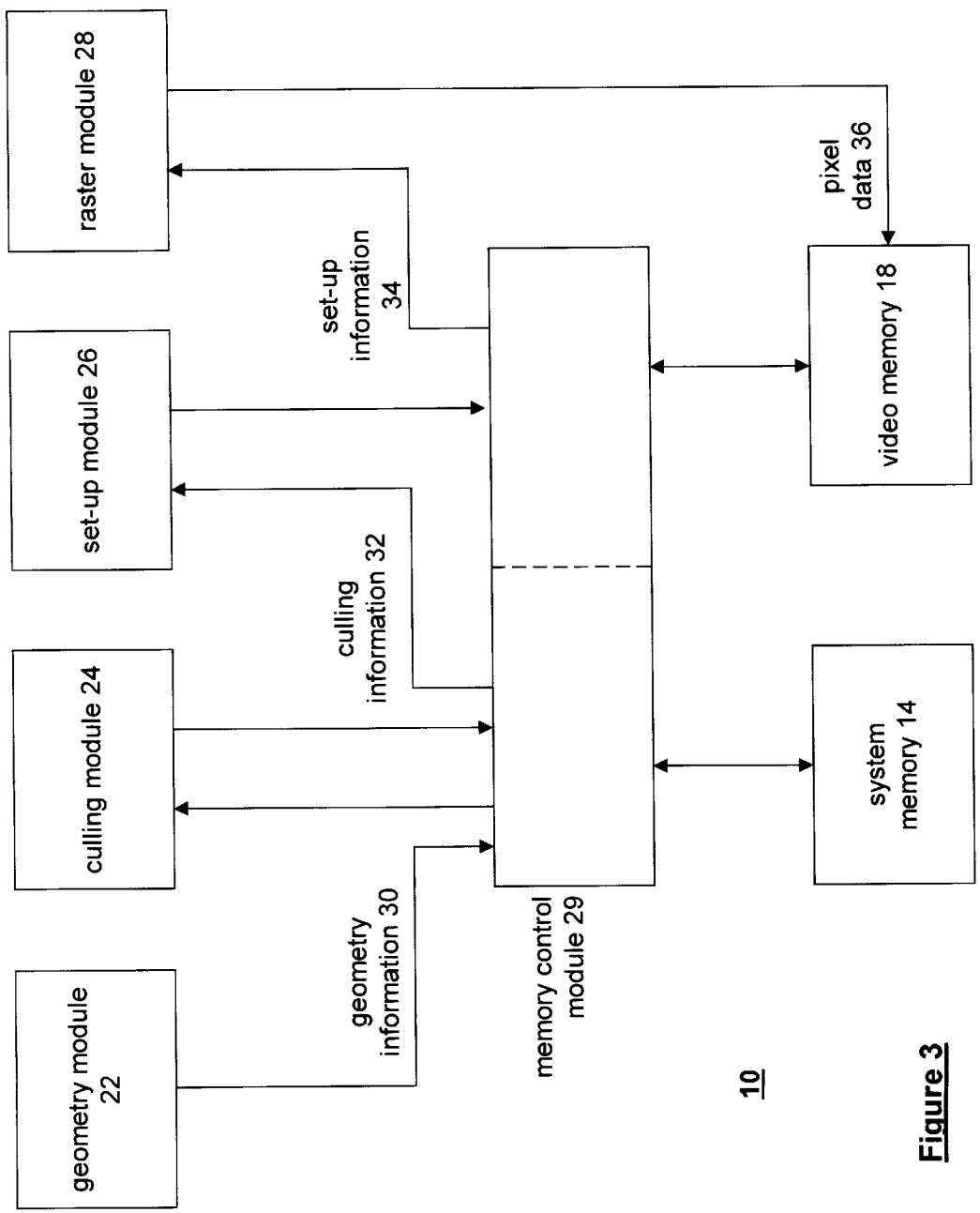
FIG. 3 illustrates a schematic block diagram of another video processing system in accordance with the present invention.

FIG. 3 illustrates another schematic block diagram of the video processing system 10. In this embodiment, the geometry module 22, the culling module 24, the set-up module 26, and the raster module 28, are coupled to the memory controller 29. As shown, the memory controller includes, essentially, two sections. The first section controls the storing and retrieval of the geometry information 30 and the culling information 32. The second section of the memory control module 29 controls the storing and retrieval of the set-up information 34.

The first section of the memory controller 29 utilizes the system memory 14 to store the geometry information 30 and the culling information 32. The second section of the memory control module 29 utilizes the video memory 18 to store the set-up information 34. As one of average skill in the art would appreciate, the present invention may be configure in numerous different embodiments. By utilizing non-local memory, the concurrency between the modules 22–28 is improved since none of the modules are waiting upon each other for their completion of their particular tasks.

Figure 4:
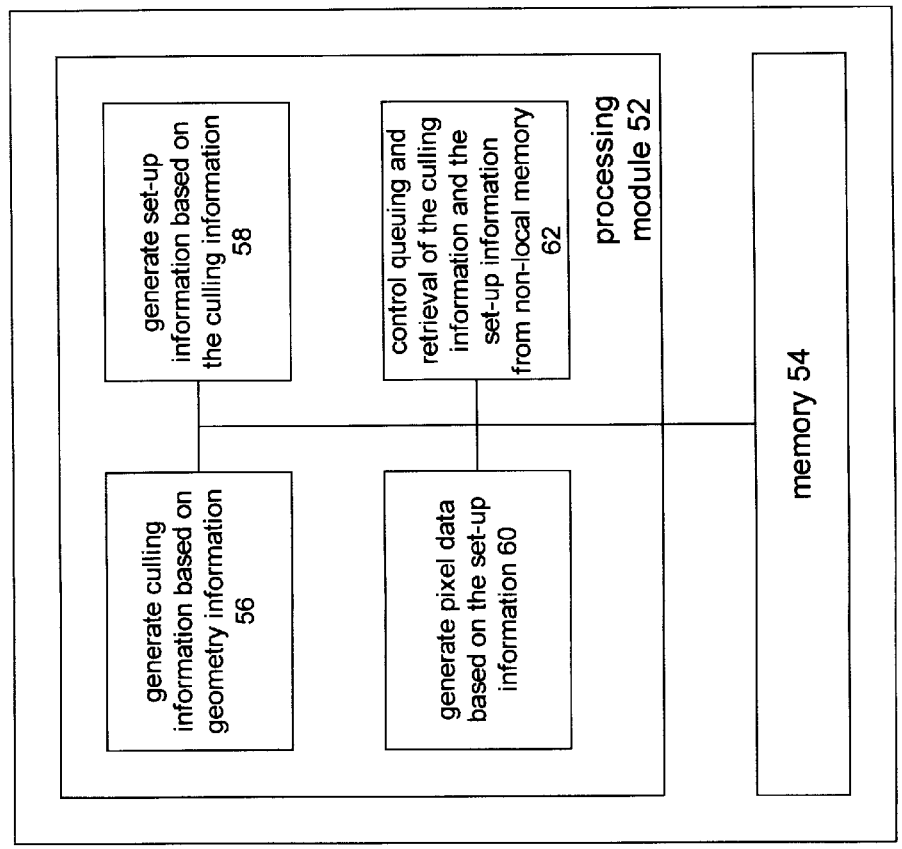
FIG. 4 illustrates a schematic block diagram of yet another video processing system in accordance with the present invention.

FIG. 4 illustrates yet another schematic block diagram of the video processing module. The video processing module 50 includes a processing module 52 and memory 54. The processing module 52 may be a microprocessor, microcontroller, digital signal processor, microcomputer, central processing unit, and/or any other device that manipulates digital information based on programming instructions. The memory 54 may be read-only memory, random access memory, floppy disk memory, hard drive memory, magnetic tape memory, DVD memory, CD memory, and/or any device that stores digital information.

The memory 54 stores programming instructions that, when read by the processing module 52, cause the processing module 52 to function as a plurality of circuits 52–62. While reading the programming instructions, the processing module functions as circuit 56 to generate culling information based on geometry information. The processing unit then functions as circuit 58 to generate set-up information based on the culling information. The processing module then functions as circuit 60 to generate pixel data from the set-up information. The processing module then functions as circuit 62 to control the queuing and retrieval of the culling information and the set-up information from the non-local memory. The programming instructions stored in memory 54 and the execution thereof by processing module 52 will be discussed in greater detail with reference to FIG. 5.

Figure 5:
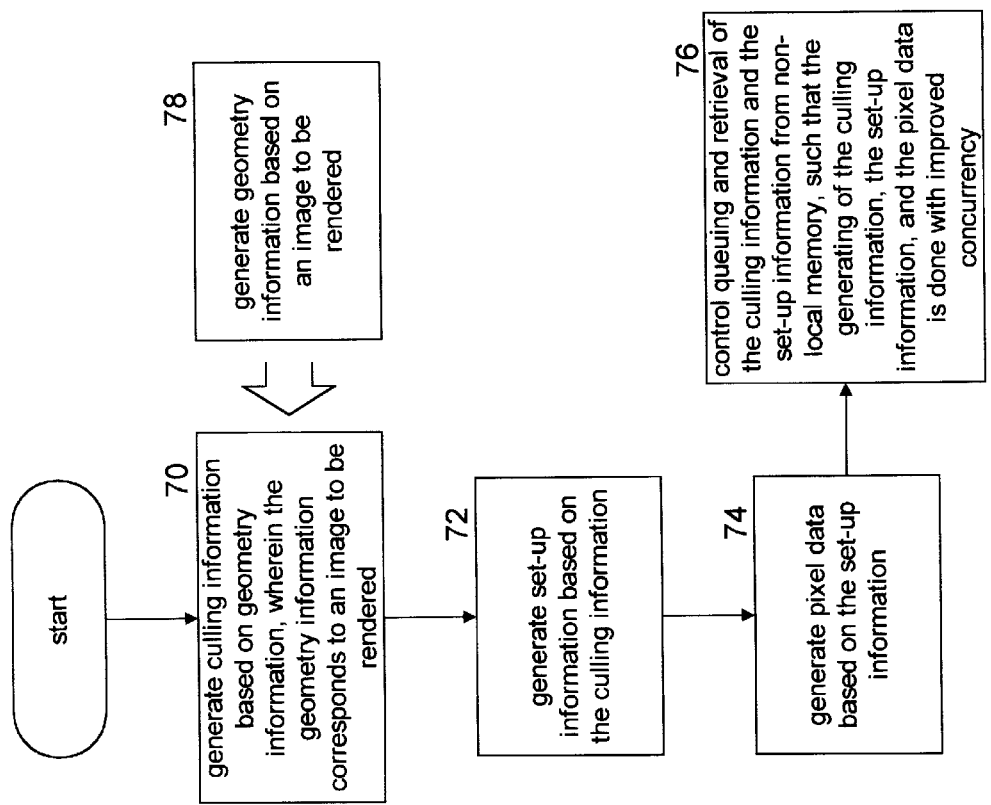
FIG. 5 illustrates a logic diagram of a method for improving concurrency within a video graphics process in accordance with the present invention.

FIG. 5 illustrates a logic diagram of a method for improved concurrency within a video graphics process. The process begins at step 70 where culling information is generated based on geometry information. The geometry information corresponds to an image that is being rendered. In addition, the geometry information may be in turn based on the particular image being rendered as shown at step 78. The process then proceeds to step 72 where set-up information is generated based on the culling information. The process then proceeds to step 74 where pixel data is generated based on the set-up information.

The process then proceeds to step 76 where the queuing and retrieval of the culling information and the set-up information from non-local memory is controlled such that the generating of the culling information, the set-up information, and the pixel data is done with improved concurrency. The improved concurrency results because the nonlocal memory can be substantially larger than local memory. As such, substantially more data may be stored between the modules of the video graphics circuit. As such, each module may perform its function at its own pace with little risk of being stalled due to the processing speed of the other modules.

The preceding discussion has presented a method and apparatus for improved concurrency within a video processing system. Such improved concurrency is obtained by utilizing non-local memory to store set-up information and culling information. When done in this manner, the concurrency within the video graphics processing system is improved.

What is claimed is:

1. A video processing system comprises:

a culling module operably coupled to receive geometry information that corresponds to an image to be rendered, wherein the culling module generates culling information based on the geometry information;

a set-up module operably coupled to the culling module, wherein the set-up module generates set-up information based on the culling information;

a raster module operably coupled to the set-up module, wherein the raster module generates pixel data of the image based on the set-up information; and a memory control module operably coupled to the culling module, the set-up module, and the raster module, at least the set-up module being connected only to the memory control module, wherein the memory control module controls queuing and retrieval of the culling information and the set-up information from non-local memory such that the culling module, the set-up module, and the raster module operate in a substantially concurrent manner.

2. The video processing system of claim 1 further comprises a geometry module operable to generate the geometry information for the image, wherein the memory control module is further coupled to the geometry module, wherein the memory control module controls the queuing and retrieval of the geometry information from the non-local memory.

3. The video processing system of claim 1, wherein at least one of the culling module, the set-up module, and the raster module is included in a chip set, wherein the chip set interfaces with a central processing unit and system memory.

4. The video processing system of claim 1, wherein at least one of the geometry module, the culling module, the set-up module, and the raster module is included in a video graphics circuit, wherein the video graphics circuit interfaces with a chip set that, in turn, interfaces with a central processing unit and system memory.

5. The video processing system of claim 1, wherein the non-local memory includes at least one of: system memory, dedicated memory, and video memory.

6. The video processing system of claim 1, wherein the geometry module further comprises programming instructions that are executed by a central processing unit to produce vertex parameters of object elements of the image.

7. The video processing system of claim 1, wherein the culling information includes, for objects of the image, at least one of back-facing data and front-facing data of objects of the image.

8. The video processing system of claim 1, further includes a first FIFO operably coupled to the set-up module, and a second FIFO operably coupled to the raster module.

9. A video processing system comprises:

an interface to a central processing unit;

an interface to system memory;

a culling module operably coupled to receive geometry information of an image for display only via the interface to the central processing unit, wherein the culling module generates culling information based on the geometry information, and wherein the culling information is provided to system memory only via the interface to system memory;

a set-up module operably coupled to receive the culling information, wherein the set-up module generates set-up information based on the culling information; and a memory control module operably coupled to the set-up module, the setup module being connected only to the memory control module, wherein the memory control module controls retrieval of the culling information and controls queuing and retrieval of the set-up information from the system memory such that the culling module and the set-up module operate in a substantially concurrent manner.

10. The video processing system of claim 9, wherein the system further comprises:

a raster module operably coupled to the set-up module, wherein the raster module generates pixel data of the image based on the set-up information; and the memory control module operably coupled to the set-up module and the raster module, wherein the memory control module controls retrieval of the culling information and controls queuing and retrieval of the set-up information from the system memory such that the culling module, the set-up module, and the raster module operate in a substantially concurrent manner.

11. The video processing system of claim 9 further comprises a set-up module operably coupled to the culling module and the interface to the system memory, wherein the set-up module receives the culling information and produces, therefrom, set-up information, and wherein the set-up information is stored in the system memory via the interface to the system memory.

12. The video processing system of claim 9 further comprises:

a set-up module operably coupled to receive the culling information via the interface to the system memory, wherein the set-up module generates set-up information based on the culling information;

a raster module operably coupled to the set-up module, wherein the raster module generates pixel data of the image based on the set-up information; and a memory control module operably coupled to the set-up module and the raster module, wherein the memory control module controls retrieval of the culling information and controls queuing and retrieval of the set-up information from the system memory such that the culling module, the set-up module, and the raster module operate in a substantially concurrent manner.

\* \* \* \* \*